United States Patent [19]
Liu

[11] 4,128,305
[45] Dec. 5, 1978

[54] CATADIOPTRIC OBJECTIVE

[75] Inventor: Wai-Min Liu, Rosemead, Calif.

[73] Assignee: The United States of America as represented by the Secretary of the Air Force, Washington, D.C.

[21] Appl. No.: 787,677

[22] Filed: Apr. 14, 1977

Related U.S. Application Data

[63] Continuation-in-part of Ser. No. 594,426, Jul. 9, 1975, abandoned.

[51] Int. Cl.² .............................................. G02B 17/08
[52] U.S. Cl. .................................... 350/201; 350/215
[58] Field of Search .......................... 350/199, 201, 215

[56] References Cited

U.S. PATENT DOCUMENTS

| | | | |
|---|---|---|---|
| 2,730,926 | 1/1956 | Back et al. | 350/201 |
| 3,490,831 | 1/1970 | Takahashi | 350/201 |
| 3,515,461 | 6/1970 | Casas et al. | 350/199 |
| 3,529,888 | 9/1970 | Buchroeder | 350/199 |
| 3,547,525 | 12/1970 | Rayces et al. | 350/201 |

Primary Examiner—Conrad J. Clark
Attorney, Agent, or Firm—Joseph E. Rusz; Arsen Tashjian

[57] ABSTRACT

A catadioptric objective lens system that has a field of view of 10°, and that will provide: a large relative aperture of 1.28; optimum performance in the S-20 spectral range; and, maximum light throughout the region of apertures for exactly the 10° field of view.

2 Claims, 2 Drawing Figures

| LENS | RADIUS (R) | THICKNESS (t) | DIAMETER (d) | SPACING (S) | INDEX OF REFR. (Nd) | ABBE. No. (V) |
|---|---|---|---|---|---|---|
| | | | | $S_1 = 2.231$ | | |
| A | $R_1 = 32.7337$<br>$R_2 = -40.5756$ | $t_1 = 1.713$ | $d_1 = 14.785$<br>$d_2 = 7.20$ | | 1.62041 | 60.33 |
| | | | | $S_2 = 2.280$ | | |
| B | $R_3 = -35.8426$<br>$R_4 = 213.4303$ | $t_2 = .924$ | $d_3 = 13.300$<br>$d_4 = 6.740$ | | 1.61310 | 44.34 |
| | | | | $S_3 = 7.524$ | | |
| C | $R_5 = -21.5671$<br>$R_6 = -36.6880$<br>$R_7 = -21.5671$ | $t_3 = .813$ | $d_5 = 11.250$<br>$d_6 = 5.500$ | | 1.53713 | 62.15 |
| | | | | $S_4 = 7.888$ | | |
| D | $R_8 = \infty$<br>$R_9 = -332.2537$ | $t_4 = .500$ | $d_7 = 6.218$ | | 1.4866 | 61.10 |
| | | | | $S_5 = 5.252$ | | |
| E | $R_{10} = 9.5268$<br>$R_{11} = 5.8540$ | $t_5 = .812$ | $d_8 = 4.650$ | | 1.62096 | 35.90 |
| | | | | $S_6 = NONE$ | | |
| F | $R_{12} = 5.8540$<br>$R_{13} = 7.3515$ | $t_6 = .773$ | $d_9 = 4.460$ | | 1.61484 | 51.16 |
| | | | | $S_7 = .181$ | | |
| G | $R_{14} = 5.4252$<br>$R_{15} = 66.8127$ | $t_7 = 1.198$ | $d_{10} = 4.400$ | | 1.62041 | 60.33 |
| | | | | $S_8 = 1.079$ | | |
| H | $R_{16} = \infty$<br>$R_{17} = \infty$ | $t_8 = .125$ | $d_{11} = 3.794$ | | 1.51680 | 64.17 |
| | | | | $S_9 = .238$ | | |
| I | $R_{18} = \infty$<br>$R_{19} = \infty$ | $t_9 = .125$ | $d_{12} = 3.794$ | | 1.51680 | 64.17 |

ALL DIMENSIONS ARE IN INCHES

F/1.2835 OBJECTIVE 460 MM E.F.L., 10° F.O.A., 80MM FOR S-20 RESPONSE AND .85 MICRONS T/NUMBER = 1.9792, BLOCKING = 32.8%, DISTORTION = +0.76% (PINCUSHION)

VIGNETTING FOR $\lambda = .85\mu$

| ANGLE | % |
|---|---|
| 2.5° | 27.976 |
| 4.5° | 54.167 |
| 5.0° | 60.714 |

FIG. 2

CATADIOPTRIC OBJECTIVE

STATEMENT OF GOVERNMENT INTEREST

The invention described herein may be used by or for the Government for governmental purposes without the payment of any royalty thereon.

CROSS REFERENCE TO RELATED APPLICATION

This application is a continuation-in-part of U.S. Patent application Ser. No. 594,426, filed July 9, 1975 now abandoned.

BACKGROUND OF THE INVENTION

This invention relates to a novel catadioptric objective lens systems and, more particularly, to one that will provide an f/1.28 aperture, that gives optimum performance in the S-20 spectral range (i.e., the 4000–8000 Angstrom Unit range), and that has a 10° field of view (hereinafter referred to as, "F.O.V.").

There is a need in the art for a catadioptric objective lens system which has a 10° F.O.V., and which gives optimum performance in the S-20 spectral range, and also which will provide maximum light throughout the range or region of apertures for exactly the 10° F.O.V.

I have invented such a catadioptric objective lens system; and, thereby, I have significantly advanced the state-of-the-art.

SUMMARY OF THE INVENTION

This invention pertains to a unique catadioptric objective lens system which, while having exactly a 10° F.O.V., gives optimum performance in the specified S-20 spectral range, and also which gives maximum light throughout its range or region of apertures for exactly the 10° F.O.V.

Therefore, the principal object of this invention is to teach the structure (i.e., the construction) of such a lens system.

Another object of this invention is to provide a catadioptric objective lens system which may be used as a photographic objective.

These objects, and other related and equally important objects, of this invention will become readily apparent after a consideration of the description herein of the invention, coupled with reference to the figures of the drawings.

DESCRIPTION OF THE DRAWINGS

FIG. 2 is a chart of constructional data for the preferred embodiment shown in FIG. 1.

DESCRIPTION OF THE PREFERRED EMBODIMENT

Figure 1:
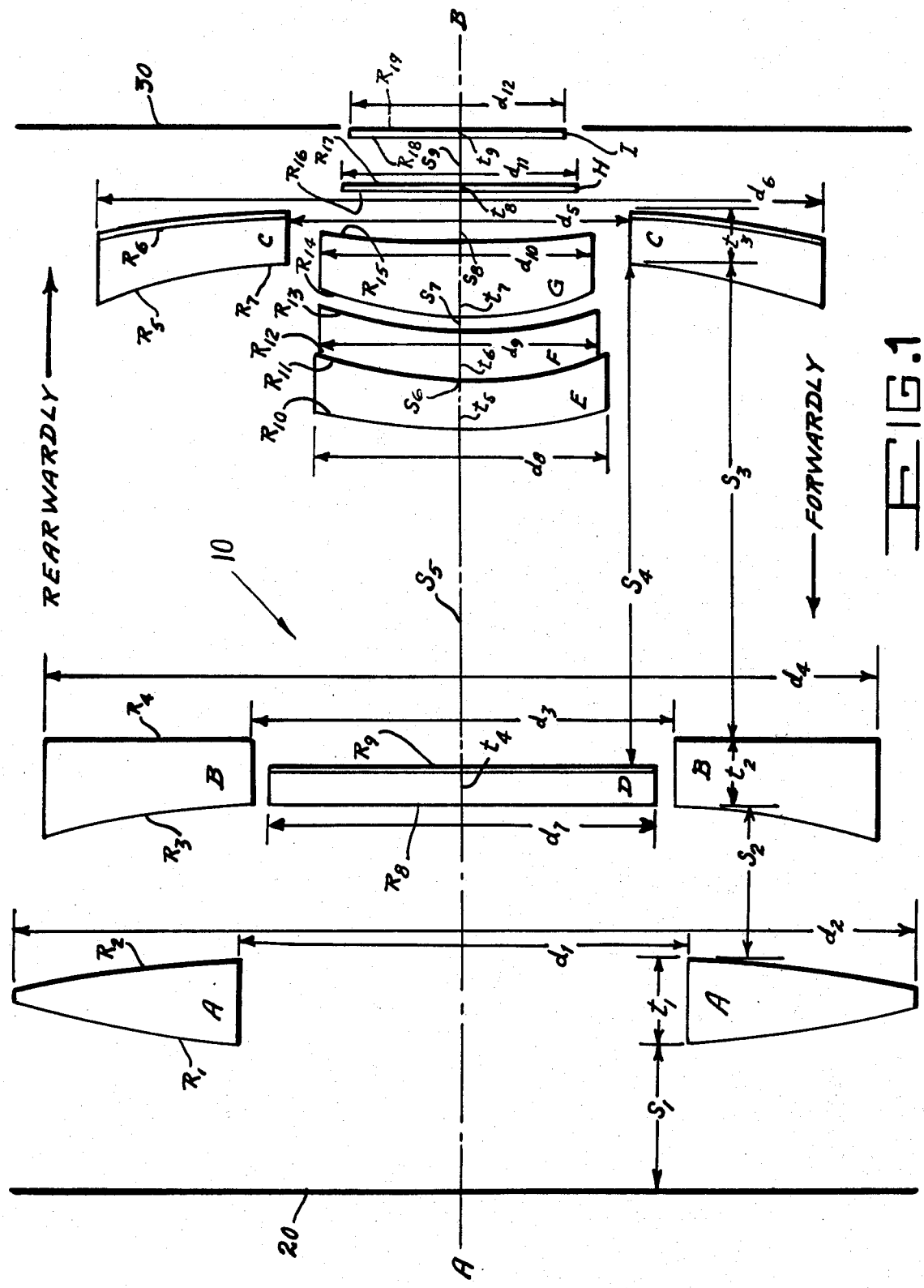
FIG. 1 is an optical diagram of a preferred embodiment of the invention.

With reference to FIG. 1, therein is shown, in a conventional optical diagram, a preferred embodiment, generally designated by reference numeral 10, of my inventive catadioptric objective lens system. Also shown therein are: object plane 20, principal optical axis A-B, and image plane 30. It is to be noted, of course, that the front or forward portion of the lens system 10 is at object plane 20 end, and that the back or rearward portion of the lens system 10 is at the image plane 30 end.

The preferred embodiment 10 includes: a double convex lens element A having a centrally located opening of diameter $d_1$ and axially aligned with axis A-B; a double concave lens element B having a centrally located opening of diameter $d_3$, with said lens element B disposed or positioned rearward of, and in axial alignment with, and also in spaced-apart relationship to, lens element A; a negative meniscus shaped lens element C, concave and reflective to the front (i.e., forwardly), having a centrally located opening of diameter $d_5$, with said lens element C positioned rearward of, and in axial alignment with, and also in spaced-apart relationship to, lens element B; a plano-convex lens element D, convex and reflective to the rear (i.e., rearwardly toward the image plane 30), with said lens element D positioned forward of, and in axial alignment with, and also in spaced-apart relationship to, lens element C, with this lens element D also simultaneously positioned within the centrally located opening of lens element B; a first positive meniscus shaped lens element E, convex to the front (i.e., toward the object plane 20), positioned rearward of, and in axial alignment with, and also in spaced-apart relationship to, lens element D; a second positive meniscus shaped lens element F, convex to the front, positioned rearward of, and in axial alignment with, and also in abutting relationship to, lens element E, a third positive meniscus shaped lens element G, convex to the front, positioned rearward of, and in axial alignment with, and also in spaced-apart relationship to lens element F, with this lens element G also simultaneously positioned partly within the centrally located opening of lens element C and partly forward of said lens element C; a first lens element H, in the geometric form of a parallel plate, positioned rearward of, and in axial alignment with, and also in spaced-apart relationship to, the third positive meniscus shaped lens element G and to the concave front negative meniscus shaped lens element C that has a centrally located opening; and, a second parallel plate lens element I that is positioned rearward of, and in axial alignment with, and also in spaced-apart relationship to, first parallel plate lens element H.

As a matter of preference, rather than of any limitation, the respective lens elements are made from the following commercially available types of optical glass: lens element A — Schott Glass Co. optical glass type number SK 16; lens element B — Schott Glass Co. optical glass type number KZFS 1; lens element C — Schott Glass Co. optical glass type number BK 6; lens element D — Corning Glass Co. "Pyrex" optical glass type number 7720; lens element E — Schott Glass Co. optical glass type number F 11; lens element F — Schott Glass Co. optical glass type number SSK 3; lens element G — Schott Glass Co. optical glass type number SK 16; first parallel plate lens element H — Schott Glass Co. optical glass type number BK7; and, second parallel plate lens element I — Schott Glass Co. optical glass type number BK 7.

With reference to FIG. 2, therein is tabulated data which, as a whole, constitutes a sufficient structural description for those skilled in the art to make and use the inventive lens system 10 shown in FIG. 1. In the interest of convenience to the reader, the chart shown in FIG. 2 is reproduced hereat.

| | LENS RADIUS (R) | THICKNESS (t) | DIAMETER (d) | SPACING (S) | INDEX OF REFRA (Nd) | ABBE NO. (v) |
|---|---|---|---|---|---|---|
| | | | | $S_1 = 2.231$ | | |
| A | $R_1 = 32.7337$<br>$R_2 = 40.5756$ | $t_1 = 1.713$ | $d_1 = 14.785$<br>$d_2 = 7.20$ | | 1.62041 | 60.33 |
| | | | | $S_2 = 2.280$ | | |
| B | $R_3 = 35.8426$<br>$R_4 = 213.4303$ | $t_2 = .924$ | $d_3 = 13.300$<br>$d_4 = 6.740$ | | 1.61310 | 44.34 |
| | | | | $S_3 = 7.524$ | | |
| C | $R_5 = 21.5671$<br>$R_6 = 36.6880$<br>$R_7 = 21.5671$ | $t_3 = .813$ | $d_5 = 11.250$<br>$d_6 = 5.500$ | | 1.53113 | 62.15 |
| | | | | $S_4 = 7.888$ | | |
| D | $R_8 = \infty$<br>$R_9 = 332.2537$ | $t_4 = .500$ | $d_7 = 6.218$ | | 1.4866 | 61.10 |
| | | | | $S_5 = 5.252$ | | |
| E | $R_{10} = 9.5268$<br>$R_{11} = 5.8540$ | $t_5 = .812$ | $d_8 = 4.650$ | | 1.62096 | 35.90 |
| | | | | $S_6 = $ NONE | | |
| F | $R_{12} = 5.8540$<br>$R_{13} = 7.3515$ | $t_6 = .773$ | $d_9 = 4.460$ | | 1.61484 | 51.16 |
| | | | | $S_7 = .181$ | | |
| G | $R_{14} = 5.4252$<br>$R_{15} = 66.8127$ | $t_7 = 1.198$ | $d_{10} = 4.400$ | | 1.62041 | 60.33 |
| | | | | $S_8 = 1.079$ | | |
| H | $R_{16} = \infty$<br>$R_{17} = \infty$ | $t_8 = .125$ | $d_{11} = 3.794$ | | 1.51680 | 64.17 |
| | | | | $S_9 = .238$ | | |
| I | $R_{18} = \infty$<br>$R_{19} = \infty$ | $t_9 = .125$ | $d_{12} = 3.794$ | | 1.51680 | 64.17 |

ALL DIMENSIONS ARE IN INCHES

F/1.2835 Objective
460MM E.F.L., 10° F.O.V., 80MM Format
S-20 Response and .85 Microns
T/Number = 1.9792, Blocking = 32.8%,
Distortion = 0.76% (Pincushion)

VIGNETTING FOR $\lambda = .85\mu$

| ANGLE | % |
|---|---|
| 2.5° | 27.976 |
| 4.5° | 54.167 |
| 5.0° | 60.714 |

What is claimed is:

1. A catadioptric objective lens system having a front end, a rear end, and a principal optical axis, comprising:
   a. a double convex lens element, having a centrally located opening, which is axially aligned with said principal optical axis of said system;
   b. a double concave lens element having a centrally located opening, with said double concave lens element disposed rearward of, and in axial alignment with, and also in spaced-apart relationship to, said double convex lens element;
   c. a negative meniscus shaped lens element, concave and reflective to the front, having a centrally located opening, with said negative meniscus shaped lens element disposed rearward of, and in axial alignment with, and also in spaced-apart relationship to, said double concave lens element;
   d. a plano-convex lens element, convex and reflective to the rear, with said plano-convex lens element disposed forward of, and in axial alignment with, and also in spaced-apart relationship to, said concave front negative meniscus shaped lens element;
   e. a first positive meniscus shaped lens element, convex to the front, disposed rearward of, and in axial alignment with, and also in spaced-apart relationship to, said plano-convex lens element;
   f. a second positive meniscus shaped lens element, convex to the front, disposed rearward of, and in axial alignment with, and also in abutting relationship to, said first positive meniscus shaped lens element;
   g. a third positive meniscus shaped lens element, convex to the front, disposed rearward of, and in axial alignment with, and also in spaced-apart relationship to, said second positive meniscus shaped element, with this said third positive meniscus shaped lens element also simultaneously disposed partly within said centrally located opening of the said concave front negative meniscus shaped lens element and partly forward of this same said lens element;
   h. a first parallel plate lens element disposed rearward of, and in axial alignment with, and also in spaced-apart relationship to said third positive meniscus shaped lens element and to said concave front negative meniscus shaped lens element having a centrally located opening
   i. and, a second parallel plate lens element disposed rearward of, and in axial alignment with, and also in spaced-apart relationship to, said first parallel plate lens element.

2. A catadioptric objective lens system made according to the following specifications:

| | LENS RADIUS (R) | THICKNESS (t) | DIAMETER (d) | SPACING (S) | INDEX OF REFRA (Nd) | ABBE NO. (v) |
|---|---|---|---|---|---|---|
| | | | | $S_1 = 2.231$ | | |
| A | $R_1 = 32.7337$<br>$R_2 = 40.5756$ | $t_1 = 1.713$ | $d_1 = 14.785$<br>$d_2 = 7.20$ | | 1.62041 | 60.33 |
| | | | | $S_2 = 2.280$ | | |
| B | $R_3 = 35.8426$<br>$R_4 = 213.4303$ | $t_2 = .924$ | $d_3 = 13.300$<br>$d_4 = 6.740$ | | 1.61310 | 44.34 |
| | | | | $S_3 = 7.524$ | | |
| C | $R_5 = 21.5671$<br>$R_6 = 36.6880$ | $t_3 = .813$ | $d_5 = 11.250$<br>$d_6 = 5.500$ | | 1.53113 | 62.15 |

-continued

| | | | | | | |
|---|---|---|---|---|---|---|
| | $R_7 = 21.5671$ | | | $S_4 = 7.888$ | | |
| D | $R_8 = \infty$ $R_9 = 332.2537$ | $t_4 = .500$ | $d_7 = 6.218$ | | 1.4866 | 61.10 |
| | | | | $S_5 = 5.252$ | | |
| E | $R_{10} = 9.5268$ $R_{11} = 5.8540$ | $t_5 = .812$ | $d_8 = 4.650$ | | 1.62096 | 35.90 |
| | | | | $S_6 = $ NONE | | |
| F | $R_{12} = 5.8540$ $R_{13} = 7.3515$ | $t_6 = .773$ | $d_9 = 4.460$ | | 1.61484 | 51.16 |
| | | | | $S_7 = .181$ | | |
| G | $R_{14} = 5.4252$ $R_{15} = 66.8127$ | $t_7 = 1.198$ | $d_{10} = 4.400$ | | 1.62041 | 60.33 |
| | | | | $S_8 = 1.079$ | | |
| H | $R_{16} = \infty$ $R_{17} = \infty$ | $t_8 = .125$ | $d_{11} = 3.794$ | | 1.51680 | 64.17 |
| | | | | $S_9 = .238$ | | |
| I | $R_{18} = \infty$ $R_{19} = \infty$ | $t_9 = .125$ | $d_{12} = 3.794$ | | 1.51680 | 64.17 |

ALL DIMENSIONS ARE IN INCHES

F/1.2835 Objective
460MM E.F.L., 10° F.O.V., 80MM Format
S-20 Response and .85 Microns
T/Number = 1.9792, Blocking = 32.8%,
Distortion = 0.76% (Pincushion)

VIGNETTING FOR $\lambda = .85\mu$

| ANGLE | % |
|---|---|
| 2.5° | 27.976 |
| 4.5° | 54.167 |
| 5.0° | 60.714 |